United States Patent [19]
Donato et al.

[11] Patent Number: 5,163,129
[45] Date of Patent: Nov. 10, 1992

[54] METHOD FOR EXPEDITING THE RENDERING OF FIGURES IN A MOVE-DRAW LANGUAGE

[75] Inventors: Nola Donato, Cupertino; Anissa Lam, Redwood City; Curtis Priem, Fremont, all of Calif.

[73] Assignee: Sun Microsystems, Inc., Mountain View, Calif.

[21] Appl. No.: 662,336

[22] Filed: Feb. 25, 1991

Related U.S. Application Data

[63] Continuation of Ser. No. 417,877, Oct. 8, 1989, abandoned.

[51] Int. Cl.⁵ .............................................. G06F 15/60
[52] U.S. Cl. .................................... 395/143; 395/141; 364/977.1
[58] Field of Search ............... 364/200, 900, 518, 521, 364/747, 750; 395/141, 143, 142, 140

[56] References Cited

U.S. PATENT DOCUMENTS

| | | | |
|---|---|---|---|
| 4,620,288 | 10/1986 | Welmers | 364/518 |
| 4,858,152 | 8/1989 | Estes | 364/550 |
| 4,884,220 | 11/1989 | Dawson et al. | 364/521 |
| 4,899,136 | 2/1990 | Beard et al. | 340/706 |
| 4,901,253 | 2/1990 | Iwano et al. | 364/522 |

*Primary Examiner*—Gary V. Harkcom
*Assistant Examiner*—Phu K. Nguyen
*Attorney, Agent, or Firm*—Blakely, Sokoloff, Taylor & Zafman

[57] ABSTRACT

A method of implementing a move-draw format to control the operation of a graphics accelerator of a computer system which includes the steps of providing a designation in a process for rendering an element defining the total element being drawn, referring to the type designation to determine whether the graphics accelerator is able to implement an algorithm for such type, and selecting the individual coordinates from the format to implement the process while ignoring the move-draw elements if the graphics accelerator is capable of implementing the algorithm.

19 Claims, 2 Drawing Sheets

| 4 | TRI | MOVE | 0 |
|---|---|---|---|
| | X COORDINATE OF $P_1$ | | 4 |
| | Y COORDINATE OF $P_1$ | | 8 |
| | | LINE | 12 |
| | X COORDINATE OF $P_2$ | | 16 |
| | Y COORDINATE OF $P_2$ | | 20 |
| | ⋮ | | ⋮ |
| 3 | TRI | MOVE | 36 |
| | X COORDINATE OF $P_1$ | | 40 |
| | Y COORDINATE OF $P_1$ | | 44 |
| | | LINE | 48 |
| | X COORDINATE OF $P_4$ | | 52 |
| | Y COORDINATE OF $P_4$ | | 56 |
| | | LINE | 60 |
| | X COORDINATE OF $P_3$ | | 64 |
| | Y COORDINATE OF $P_3$ | | 68 |
| 2 | TRI | MOVE | 72 |
| | X COORDINATE OF $P_5$ | | 76 |
| | Y COORDINATE OF $P_5$ | | 80 |
| | ⋮ | | ⋮ |
| 1 | TRI | MOVE | 104 |
| | X COORDINATE OF $P_6$ | | 108 |
| | Y COORDINATE OF $P_6$ | | 112 |
| | ⋮ | | ⋮ |
| | | LINE | 128 |
| | X COORDINATE OF $P_7$ | | 132 |
| | Y COORDINATE OF $P_7$ | | 136 |

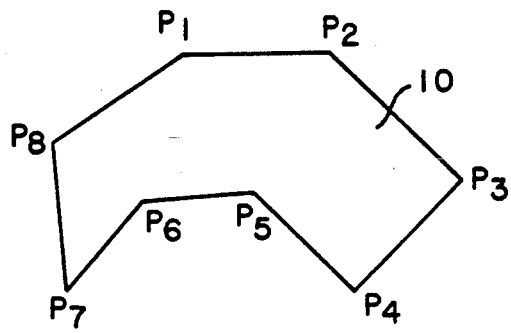

FIG. 1

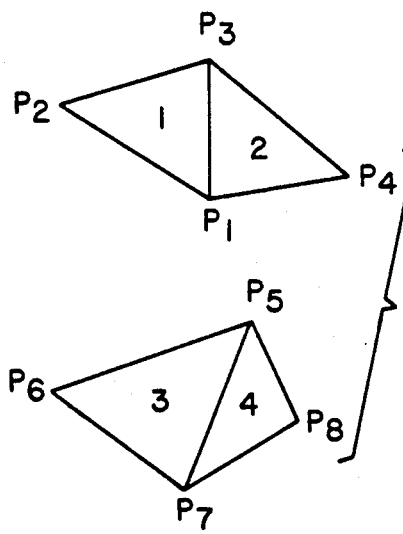

| MOVE |
| --- |
| X COORDINATE OF $P_1$ |
| Y COORDINATE OF $P_1$ |
| LINE |
| X COORDINATE OF $P_2$ |
| Y COORDINATE OF $P_2$ |
| LINE |
| X COORDINATE OF $P_3$ |
| Y COORDINATE OF $P_3$ |
| MOVE |
| X COORDINATE OF $P_1$ |
| Y COORDINATE OF $P_1$ |
| LINE |
| X COORDINATE OF $P_4$ |
| Y COORDINATE OF $P_4$ |
| LINE |
| X COORDINATE OF $P_3$ |
| Y COORDINATE OF $P_3$ |
| MOVE |
| X COORDINATE OF $P_5$ |
| Y COORDINATE OF $P_5$ |
| LINE |
| X COORDINATE OF $P_6$ |
| Y COORDINATE OF $P_6$ |
| LINE |
| X COORDINATE OF $P_7$ |
| Y COORDINATE OF $P_7$ |
| MOVE |
| X COORDINATE OF $P_5$ |
| Y COORDINATE OF $P_5$ |
| LINE |
| X COORDINATE OF $P_8$ |
| Y COORDINATE OF $P_8$ |
| LINE |
| X COORDINATE OF $P_7$ |
| Y COORDINATE OF $P_7$ |

| | | | |
|---|---|---|---|
| 4 | TRI | MOVE | 0 |
| X COORDINATE OF $P_1$ | | | 4 |
| Y COORDINATE OF $P_1$ | | | 8 |
| | | LINE | 12 |
| X COORDINATE OF $P_2$ | | | 16 |
| Y COORDINATE OF $P_2$ | | | 20 |
| ⋮ | | | ⋮ |
| 3 | TRI | MOVE | 36 |
| X COORDINATE OF $P_1$ | | | 40 |
| Y COORDINATE OF $P_1$ | | | 44 |
| | | LINE | 48 |
| X COORDINATE OF $P_4$ | | | 52 |
| Y COORDINATE OF $P_4$ | | | 56 |
| | | LINE | 60 |
| X COORDINATE OF $P_3$ | | | 64 |
| Y COORDINATE OF $P_3$ | | | 68 |
| 2 | TRI | MOVE | 72 |
| X COORDINATE OF $P_5$ | | | 76 |
| Y COORDINATE OF $P_5$ | | | 80 |
| ⋮ | | | ⋮ |
| 1 | TRI | MOVE | 104 |
| X COORDINATE OF $P_6$ | | | 108 |
| Y COORDINATE OF $P_6$ | | | 112 |
| ⋮ | | | ⋮ |
| | | LINE | 128 |
| X COORDINATE OF $P_7$ | | | 132 |
| Y COORDINATE OF $P_7$ | | | 136 |

FIG. 4

| | | | | |
|---|---|---|---|---|
| 0 | 1 | TRI | LF2D | MOVE |
| 4 | FLOAT 0 | | | |
| 8 | FLOAT 0 | | | |
| 12 | | | | LINE |
| 16 | FLOAT 100 | | | |
| 20 | FLOAT 100 | | | |
| 24 | | | | LINE |
| 28 | FLOAT 200 | | | |
| 32 | FLOAT 0 | | | |
| 36 | 1 | TRI | LB2D | MOVE |
| 40 | FRACT 0 | | | |
| 44 | FRACT -100 | | | |
| 48 | | | | LINE |
| 52 | FRACT 100 | | | |
| 56 | FRACT -200 | | | |
| 60 | | | | LINE |
| 64 | FRACT 200 | | | |
| 68 | FRACT -100 | | | |

FIG. 5

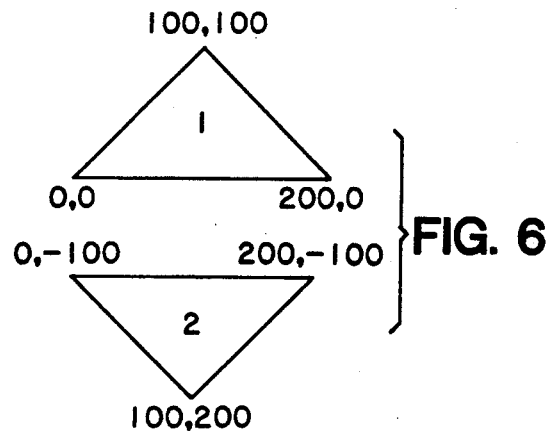

FIG. 6

METHOD FOR EXPEDITING THE RENDERING OF FIGURES IN A MOVE-DRAW LANGUAGE

This is a continuation of application Ser. No. 07/417,877 filed Oct. 8, 1989, now abandoned.

BACKGROUND OF THE INVENTION

1. Field of the Invention

This invention relates to computer systems and, more particularly, to methods for expediting the operation of graphics accelerators in rendering figures when using a move-draw language.

2. History of the Prior Art

There have be a number of examples of the use of move-draw languages in the prior art. Some dedicated graphics terminals such as the IBM 5080 and the Tektronix Graphics Terminal have used move-draw languages. The SGI Graphics Library includes move-draw processes.

The best known move-draw language is Postscript. Postscript is a computer language which has been developed to enable the precise and complete description and printing of graphic elements by computers. Postscript is widely used in providing printed graphics through advanced laser printers. For a number of reasons including its facility in providing very accurate graphics output images, implementations and improvements of Postscript and similar languages are being utilized for more general purposes in providing computer applications.

Postscript is a move-draw language, one whose commands direct an output device to either move from an initial point to a second point without drawing between the initial point and the second point, or to draw a straight line or curve segment from an initial point to a second point. Postscript also allows a figure rendered in this manner to be filled or left empty. Thus, by designating move or draw commands and the set of coordinates for each of a number of connected points defining a figure, any desired figure may be rendered.

Normally a process in a move-draw language defining a figure to be rendered is written as a set of instructions; in Postscript and in this description this set of instruction is called a path. A path begins with the move command, an X coordinate of a first point of the figure, and a Y coordinate of the first point of the figure. The path continues with a draw command, an X coordinate of a second point of the figure, and a Y coordinate of the second point of the figure. The path continues with draw commands each having an associated set of coordinates for a related point until all of the points defining the connected points of the figure have been joined. Disconnected elements to be described are indicated by another sequence of move, draw, draw, . . . commands. A path may contain an arbitrary number of such sequences.

It will be appreciated by those skilled in the art that the time required by a computer or by any processor implementing the process will be substantial for complicated figures, the figures for which this language was specifically designed.

Certain processors, for example, co-processors and graphics accelerators implement particular drawing algorithms which are designed to render often used figures more rapidly than they can be rendered by the step-by-step plodding through the complete path process. For example, certain graphics accelerators implement fast algorithms which are designed to rapidly produce vectors, triangles, and quadrilaterals given only the coordinates of the points defining the particular figures and a definition of the figure being rendered. Such graphics accelerators may also provide means for rapidly repeating a figure which is to be rendered a plurality of times whether to produce individual or composite figures. A particular graphics accelerator of this type is described in U.S. patent application Ser. No. 07/297,590, entitled APPARATUS AND METHOD FOR LOADING COORDINATE REGISTERS FOR USE WITH A GRAPHICS SUBSYSTEM UTILIZING AN INDEX REGISTER, Priem and Malachowsky, filed Jan. 3, 1989, and assigned to the assignee of this invention, now abandoned.

Unfortunately, when these co-processors and graphics accelerators are presented a process written in a move-draw language format such as that described, they treat the path process as a list of individual instructions. This occurs because these move-draw languages do not define the figure to be rendered in a format such that the devices may make use of their fast algorithms; consequently, the graphics devices slowly traverse through the path process to render the output. Since the figures themselves are not described by the move-draw languages in a manner to allow the use of the fast algorithms, it is axiomatic that the number of times a figure is to be repeated is not described by these languages.

It is possible to translate from the move-draw language format to a format which the particular graphics device can understand in utilizing its internal algorithms to obtain accelerated rendering of figures. For example, such a translation might cause the device to count the number of vertices of a figure to determine whether a particular algorithm might be used. However, this translation in itself is normally sufficiently time consuming that no overall increase in speed is obtained. Moreover, such translation may well be individual to the particular graphics devices so that individual processes would need to be prepared for each graphics device to be utilized.

SUMMARY OF THE INVENTION

It is, therefore, and object of the present invention to provide a method for allowing the utilization of move-draw languages by the fast rendering algorithms of graphic accelerating devices.

It is another object of the present invention to provide a method for allowing the utilization of move-draw languages by the fast rendering algorithms of graphics accelerating devices which still allows the use of the process in conventional implementations for providing graphics output.

It is yet another object of the present invention to provide a method for allowing the utilization of move-draw languages by the fast rendering algorithms of a plurality of graphics accelerating devices.

These and other objects are accomplished in the present invention by a method of implementing a move-draw format to control the operation of a graphics accelerator of a computer system which includes the steps of providing a designation in a process for rendering a figure defining the type of figure being drawn, referring to the type designation to determine whether the graphics accelerator is able to implement an algorithm for such type, and selecting the individual coordinates from the process to implement the process to the exclusion of the other process elements if the graphics accelerator is capable of implementing such an algorithm.

These and other objects and features of the present invention will be better understood by reference to the detailed description which follows, taken together with the drawings in which like elements are referred to by like designations throughout the several views.

BRIEF DESCRIPTION OF THE DRAWINGS

FIG. 1 is a diagram representing a particular figure which may be rendered as the output of a computer device.

FIG. 2 illustrates a particular process used in a move-draw language for representing a pair of composite figures defined by four triangles.

FIG. 3 illustrates a pair of composite figures defined by triangles useful in describing the operation of the present invention.

FIG. 4 illustrates a particular process used in a move-draw language for representing the composite figures of FIG. 3 in accordance with the present invention.

FIG. 5 illustrates in more detail a process used in a move-draw language for representing a pair of triangles in accordance with the present invention.

FIG. 6 illustrates a pair of triangles useful in describing the operation of the present invention.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method opeations in operating a computer and the method of computation itself should be borne in mind. The present invention relates to method steps for operating a computer in processing electrical or other (e.g. mechanical, chemical) physical signals to generate other desired physical signals.

DETAILED DESCRIPTION OF THE INVENTION

Referring now to FIG. 1 there is illustrated a FIG. 10. The polygon 10 represented by a number of points P1 through P8. In order to render polygon 10 using a move-draw language, a process such as the following might be written:

Move P1
Draw P2
Draw P3
Draw P4
Draw P5
Draw P6
Draw P7
Draw P8
Draw P1

In any particular language, the wording of the commands might vary, but, in general terms, these are the commands given.

In the first step of the process, the position of the cursor, pen, or other output device is moved to the coordinates of point P1 from whatever its position may be. In the second step, a straight line is rendered from the initial point P1 to the coordinates of the point P2. In the third and each succeeding step, a straight line is rendered from point at which the output device lies at the end of the preceding step to the coordinates of next point P3 through P8 and back to point P1. In this manner, the complete polygon illustrated in FIG. 1 is described at the output.

It will be recognized by those skilled the art, that each step of the path process described requires that the particular command to be utilized be recovered from memory and that the command be interpreted and executed to the particular point described. Moreover, even though a command may be repeated a number of times in succession (the draw command, for example), the command must be retreived from memory each time it is executed. Running the process requires some given particular time to execute all of its steps when run on any particular computer system.

As pointed out above, certain processors, for example, graphics co-processors and graphics accelerators are designed to implement particular drawing algorithms more rapidly than they are able to traverse through the normal step-by-step rendering of a path process written in a move-draw language. For example, certain graphics accelerators implement exceptionally fast algorithms which are designed to produce vectors, triangles, and quadrilaterals when furnished only the coordinates of the particular figure and a definition of the figure being rendered. Such graphics accelerators may also provide a means for rapidly rendering a group of figures of the same kind or for rendering a number of line segments at a time if they have prior knowledge of how many connected line segments follow.

Unfortunately, when presented a process written in a move-draw language format as has been described, these co-processors and graphics accelerators simply treat the process as a list of individual instructions and slowly traverse through the process to render the output. This occurs because these move-draw languages neither explain the figure to be rendered nor the number of times a figure of this type is to be rendered so that the graphics devices may make use of their fast algorithms.

FIG. 2 illustrates the data structure of a particular path process for drawing four triangles which are illustrated in FIG. 3. The data structure or listing shown in FIG. 2 includes a command and a pair of coordinates for each particular point of the triangles; this listing is simply a more formal arrangement of the particular process defined above for a move-draw language. It will be understood by those skilled in the art that the particular elements of each step of the process must be carried out in order so that the particular triangles illustrated in FIG. 3 may be rendered. A review of the pseudocode representation of the process listed in FIG. 2 illustrates that no indication is contained in the path of shapes which are to be rendered or of the number of times each such shape is to be rendered. Consequently, a process defined as in FIG. 2 cannot utilize the fast drawing algorithms implemented in various graphics accelerators and other pieces of hardware utilized in providing graphic output images.

It will also be understood by those skilled in the art that the particular representations of each of the elements of each step of the process shown in FIG. 2 are pseudocode representations of the actual code which might be used for the particular steps. In fact, the structure for each of the commands is such that thirty-two bits of storage are used for each of the lines of code in a preferred embodiment of the invention. This data structure is used because most graphics accelerators and other systems operate more rapidly if they are able to handle information which is divided on integer boundaries. In a particular preferred embodiment of the invention, the actual division takes place on boundaries which include four bytes. For this reason, thirty-two bits of storage are used for each individual line of code.

It has been determined that the actual memory space required for each of the commands is much less than the thirty-two bits that are provided by the data structure in order to allow the smallest elements to be on integer boundaries. However, the increase in speed attained by arranging the data structure to divide on integer boundaries is sufficiently great that the waste of memory involved has been found a reasonable trade-off. The present invention makes use of the excess space provided in the command field of the data structure to further increase the speed of operation in running such a move-draw process, up to three times that of the graphics accelerator described in the co-pending patent application referred to above, while allowing the process to run without modification on devices which do not include the fast algorithm facility.

The present invention accomplishes the foregoing by designating in the otherwise unused space of the command field, a description of space the particular figure which the lines of code are rendering and the number of times the figure is to be rendered. FIG. 4 illustrates a path modified in accordance with the invention to render the four triangles shown in FIG. 3. Again the representations are pseudocode representations in order to better convey the meaning of each element of the process. At each of the lines of instruction in the path process in which the command field is given, the shape to be drawn is also included and a count is given.

For example, in FIG. 4 the first instruction at line 0 of the path process includes a four to indicate that four shapes of the same type are to be rendered. The "tri" indicates that four shape to be rendered is a triangle. The next two lines of code (lines 4 and 8) indicate the X and Y coordinates of the initial point P1 of the first triangle. The line numbered 12 provides the next command field. It should be noted that since this type designation includes only the "line" command (the command for drawing a straight line) since it is not necessary within a shape to indicate again the count or the shape being rendered. The line of code numbered 36 begins the second triangle; and, again, the count (which is now three) and the shape are included. It should be noted that the decreasing count for each triangle allows the process to switch out to some other process and yet return without having to go back to the original point of the process. It should also be noted that in the particular move-draw code illustrated, it is not necessary for the last side of the triangle to be designated by an individual command; the shape merely closes upon itself.

FIG. 5 illustrates in more detail, using command language from the preferred embodiment of the invention, the path for rendering a pair of triangles which are illustrated in FIG. 6. In the path shown in FIG. 5, the coded language has the following meaning:
L—at the beginning of code means draw a shape,
B—refers to the FRACT code format,
F—refers to floating point code format,
2D—refers to two dimensional shapes having but two coordinates.

Other coded entries use the usual pseudocode representations for a move-draw language. Thus the first line of code illustrated in FIG. 5 indicates that a single figure is to be drawn and the shape of the figure is a triangle. LF2D signifies that the coordinates are coded as floating point numbers, that the particular command is to draw the triangle, and that the shape is two dimensional so that only two coordinates are expected for each point. The MOVE command is the normal pseudocode representation of the command given in a move-draw language to accomplish a move. The remaining lines defining the first triangle are self explanatory.

The tenth line of code 36 begins the second triangle which for the purpose of explanation of this invention has its coordinates defined in the FRACT number format. Because a number format is used which is different than the format used for the first triangle, a one is placed in the count position to designate to the graphics accelerator hardware that this is the only one of these shapes to be defined. Again, the code defines the shape as a triangle, and LB2D explains that a draw command is being executed for a two dimensional triangular shape with FRACT coordinates.

The code illustrated in FIG. 5 is used as follows when run on the graphics accelerator referred to in the co-pending patent application. The hardware looks to the first line of the geometric designation, determines that one triangle is to be drawn in the floating point format, then ignores all but the three additional sets of coordinates necessary to provide the three vertices of the triangle. If the count had been higher, the program would have continued through all of the triangles until all of the triangles had been rendered without the need to obtain any of the move-draw commands from memory. Thus, the hardware need not call down the commands for mvoe and draw, it merely looks for the expected coordinates and draws the shape using its exceptionally fast algorithm for the described figure.

This invention offers a substantial number of advantages. It accomplishes its purposes without requiring more storage than that required to implement the process in the normal move-draw path structure. It allows a process to run much faster on graphics devices having algorithms for accelerating the rendering of particular shapes. It is entirely compatible with other versions of the process coded using the normal path form. It is able to be used for rendering both polygons and vectors.

Although the invention has been described in a preferred embodiment, it will be clear to those skilled in the art that many modifications may be made to the invention described without departing from the spirit and scope of the invention. It will, therefore, be appreciated that the invention should be considered to be particularly defined by the claims which follow.

What is claimed is:

1. A method to expedite the execution of a move-draw language in rendering graphic figures, each of said graphic figures being described by a move-draw path process containing at least one set of commands and corresponding coordinates, said at least one of commands comprising a first command and at least one associated command to be interpreted and executed in a sequential manner, said path process being represented by a data structure stored in a memory unit with said commands and said coordinates as elements of said data structure, said method comprising the steps of:

adding at least one descriptor for a graphic figure to the first command of said at least one set of commands that renders the graphic figure, said descriptor providing a compact description of the graphic figure described by said at least one set of commands;

providing said first command with said added at least one descriptor and said coordinates to a program means, said program means including interpreting and execution means for executing algorithms to render said graphic figure based on said at least one added descriptor and said coordinates;

interpreting the first command with said added at least one descriptor; and skipping interpretation of said at least one associated command without said added descriptors, thereby minimizing access to the memory unit and eliminating processing time for interpreting said skipped commands.

2. The method to expedite execution of a move-draw language in rendering graphic figures as claimed in claim 1, wherein said at least one descriptor include a shape descriptor for said figure to be rendered.

3. The method to expedite execution of a move-draw language in rendering graphic figures as claimed in claim 2, wherein said shape descriptor for said figure to be rendered is a trihedral figure.

4. The method to expedite execution of a move-draw language in rendering graphic figures as claimed in claim 2, wherein said shape descriptor for said figure to be rendered is a tetrahedral figure.

5. The method to expedite execution of a move-draw language in rendering graphic figures as claimed in claim 2, wherein said shape descriptor for said figure to be rendered is a polyhedral figure.

6. The method to expedite execution of a move-draw language in rendering graphic figures as claimed in claim 1, wherein said at least one descriptor include a count, indicating the number of times said figure are to be rendered.

7. The method to expedite execution of a move-draw language in rendering graphic figures as claimed in claim 1, wherein said at least one descriptor include a data type descriptor for said coordinates for said figure to be rendered.

8. The method to expedite execution of a move-draw languate in rendering graphic figures as claimed in claim 7, wherein said data type descriptor for said coordinates of said figure to be rendered is in binary format.

9. The method to expedite execution of a move-draw language in rendering graphic figures as claimed in claim 7, wherein said data type descriptor for said coordinates of said figure to be rendered is in hexadecimal format.

10. The method to expedite execution of a move-draw language in rendering graphic figures as claimed in claim 7, wherein said data type descriptor for said coordinates of said figure to be rendered is in decimal format.

11. The method to expedite execution of a move-draw language in rendering graphic figures as claimed in claim 7, wherein said data type descriptor for said coordinates of said figure to be rendered is in floating point format.

12. The method to expedite execution of a move-draw language in rendering graphic figures as claimed in claim 7, wherein said data type descriptor for said coordinates of said figure to be rendered is in fract number format.

13. The method to expedite execution of a move-draw language in rendering graphic figures as claimed in claim 1, wherein said at least one descriptor include a dimensional descriptor indicating number of tuples for said coordinates for said figure to be rendered.

14. The method to expedite execution of a move-draw language in rendering graphic figures as claimed in claim 13, wherein said dimensional descriptor indicating the number of tuples for said coordinates for said figure to be rendered is two.

15. The method to expedite execution of a move-draw language in rendering graphic figures as claimed in claim 13, wherein said dimensional descriptor indicating the number of tuples for said coordinates for said figure to be rendered is three.

16. The method to expedite execution of a move-draw language in rendering graphic figures as claimed in claim 1, wherein said adding of said at least one descriptor for said figure to be rendered is accomplished through the unused bits in said elements of said data structure containing said commands.

17. The method to expedite execution of a move-draw language in rendering graphic figures as claimed in claim 16, wherein each of said elements of said data structure has the same number of bits.

18. The method to expedite execution of a move-draw language in rendering graphic figures as claimed in claim 16, wherein each of said elements of said data structure has 32 bits.

19. The method to expedite execution of a move-draw language in rendering graphic figures as claimed in claim 1, wherein said program means is a graphics accelerator.

* * * * *

UNITED STATES PATENT AND TRADEMARK OFFICE
CERTIFICATE OF CORRECTION

PATENT NO. : 5,163,129
DATED : November 10, 1992
INVENTOR(S) : Donato et al.

It is certified that error appears in the above-identified patent and that said Letters Patent is hereby corrected as shown below:

In column 7, claim 1 at line 15, please delete " one " and insert -- one set --.

Signed and Sealed this

Sixteenth Day of September, 1997

Attest:

BRUCE LEHMAN

Attesting Officer

Commissioner of Patents and Trademarks